United States Patent [19]

Eiselt et al.

[11] 4,164,162
[45] Aug. 14, 1979

[54] METHOD OF AND DEVICE FOR CUTTING BLOCKS OF FOAMED MATERIAL

[76] Inventors: Günter Eiselt, Schopenhauerweg; Rudolf Hossbach, Am Kreuzbüchel, both of 5463 Unkel, Fed. Rep. of Germany

[21] Appl. No.: 788,230

[22] Filed: Apr. 18, 1977

Related U.S. Application Data

[62] Division of Ser. No. 537,964, Jan. 2, 1975, Pat. No. 4,033,213.

[30] Foreign Application Priority Data

Jan. 3, 1974 [DE] Fed. Rep. of Germany ....... 2400204
Feb. 6, 1974 [DE] Fed. Rep. of Germany ....... 2405554
Sep. 4, 1974 [DE] Fed. Rep. of Germany ....... 2442353

[51] Int. Cl.$^2$ ............................................. B23D 61/16
[52] U.S. Cl. .................................. 83/651.1; 125/12; 83/661; 83/875
[58] Field of Search ................ 83/651.1, 4, 661; 125/12, 21

[56] References Cited

U.S. PATENT DOCUMENTS

| | | | |
|---|---|---|---|
| 2,284,919 | 6/1942 | Nielson | 83/651.1 |
| 2,604,883 | 7/1952 | De V. Avaucourt | 83/651.1 |
| 2,771,872 | 11/1956 | Bergling | 83/651.1 |
| 3,263,537 | 8/1966 | Rehman et al. | 83/4 |

*Primary Examiner*—Donald R. Schran
*Attorney, Agent, or Firm*—Becker & Becker, Inc.

[57] ABSTRACT

A method of and device for cutting blocks of foamed material, e.g. polyethylene. An endless cable of elastic wear resistant material e.g. steel, having a rough surface and a diameter of from 0.5 to 2 mm is preloaded at a force of from 5 to 30kp. The cable is operated at a speed of rotation of from 30 to 60 m/sec while the foamed material is being moved relative thereto toward the foamed material to be cut along a plane extending in a direction transverse to the direction of movement of the cable. The cable of elastic material having helically wound therearound a wear resistant wire with a diameter of from 0.1 to 0.3 mm.

2 Claims, 9 Drawing Figures

METHOD OF AND DEVICE FOR CUTTING BLOCKS OF FOAMED MATERIAL

This is a divisional application of co-pending application, Ser. No. 537,964-Eiselt, et al., filed Jan. 2, 1975, now U.S. Pat. No. 4,033,213-Eiselt, et al issued July 5, 1977.

The present invention relates to a method and device for cutting up blocks of foamed synthetic material. So-called band saws with an endless circulating saw blade have become known which are suitable for cutting up blocks of foamed synthetic material. These endless saw blades of band saws circulate at high speed so that a relatively high cutting speed can be realized. Curved cuts are possible in view of the shape of the saw blade but only at a relatively great radius. When cutting along a small radius, a non-uniform and non-clean cut will result.

In order to permit a relatively greatly curved cut, attempts have been made with a spiral shaped blade as they are used for instance for woodworking with a fret saw. With such spiral saw blade, cuts can be made having a relatively short radius. However, in view of the high pull stresses necessary with such saw blades for a clean straight cut, such saw blades are destroyed after a short period of operation. In this connection, it is also to be borne in mind that the individual teeth of such saw blades form notches which greatly aid the tearing or breaking of such saw blades when they are subjected to corresponding stresses. A particular drawback of these spiral saw blades consists in that they cannot be made endless and can be used only as oscillating tools at a corresponding low obtainable cutting speed.

In connection with the cutting of foamed materials it is also known to employ a relatively thin heated filament clamped in between two electrodes, which is moved relative to the block of foamed material that has to be cut. While by means of such heated filaments a block of foamed material can be cut along a relatively short radius, it is to be noted that in view of the high temperature of the heated filament, the separating surfaces are due to physical and chemical changes in the synthetic material not suitable any longer within this region for connecting the foamed sections prepared in this way to each other by gluing. Furthermore, when employing heated filaments for cutting blocks of foamed material there also exists a fire hazard.

It is, therefore, an object of the present invention to provide a method of and tool for cutting blocks of foamed material at a high cutting speed and along very short radii while realizing clean cuts and curved separating surfaces.

It is another object of this invention to provide a method of and device for cutting blocks of foamed materials as set forth above, in which the separating surfaces will well be suitable for connection with other foamed parts while fire hazards will safely be avoided.

It is a still further object of this invention to provide a method and device as set forth which will reduce the loss in material to a minimum.

These and other objects and advantages of the invention will appear more clearly from the following specification in connection with the accompanying drawings, in which.

The method according to the present invention of cutting blocks of foamed material as for instance foamed polyethylene is characterized primarily in that an endless cable of elastic wear resistant material as for instance steel with a rough surface and a diameter of from 0.5 to 2 mm is tensioned by means of a force of approximately from 5 to 30 kp and is driven at a rotary speed of from 30 to 60 meters per second, and is furthermore characterized in that the foamed material is moved relative toward the cable in a plane located transverse to the direction of movement of the cable.

Tests carried out with a tool according to the invention have shown that this tool have over other heretofore known cutting tools a considerably longer service life. By means of the tool according to the invention, it is possible to carry out practically any desired cut with a very narrow cut width and with practically no loss of material. A further advantage of the tool consists in that it can be produced at low expenses.

Figure 1:
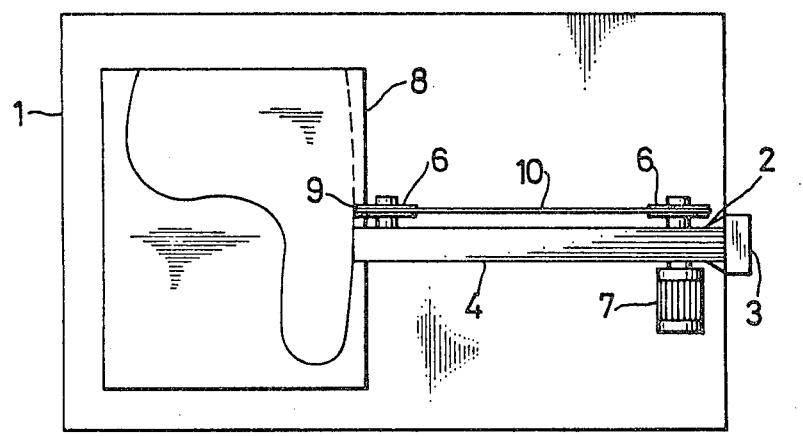
FIG. 1 is a top view of a device according to the invention for cutting blocks of foamed material.

Referring now to the drawings in detail, the device diagrammatically illustrated as top view of FIG. 1 comprises primarily a working table 1 and a U-shaped frame 2 fixedly connected to the working table 1. Frame 2 has frame sections of which the vertical frame part and the upper frame part 4 above the working table 1 is visible. That frame section which is parallel to frame section 4 and similar to the latter is rigidly connected to the frame section 3, is provided below the plane of the working table 1. At the frame 2, driving and guiding rollers 6 are rotatably journalled of which rollers two rollers each are arranged on the frame section 4 and on the frame section which is parallel thereto and extends below the working table 1. For purposes of driving one of the driving or guiding rollers 6 there is on the frame section 4 provided a motor 7. Guided over the driving and guiding rollers 6 is a tool according to the invention which is tensioned at a predetermined force and is driven by the motor 7 at a predetermined cutting speed and circulating speed. That part 9 of the tool 10 which extends between the guiding roller 6 mounted at the free end of frame section 4, and the corresponding guiding roller 6 below the work table 1 extends in a direction transverse to the plane of the work table 1. By displacing a block 8 of foamed material on the work table 1 and relative toward the part 9 of the tool 10, the block 8 can be cut in conformity with the desired curve.

Figure 2:
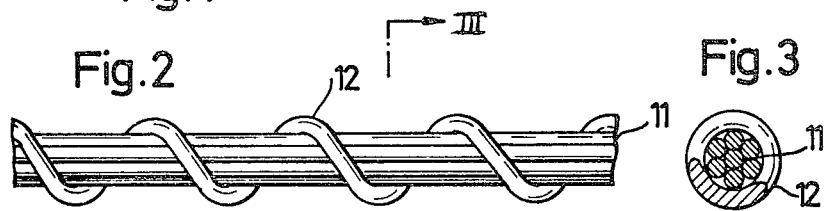
FIG. 2 is a cut-out of a possible embodiment of a tool for practicing the method according to the invention.
Figure 3:
FIG. 3 is a section taken along the line III—III of FIG. 2.

The tool shown in FIGS. 2 and 3 comprises a cable 11 which is made of elastic wear resistant material as for instance steel wire. Wound around the cable 11 at a predetermined pitch is a wire 12 which likewise consists of wear resistant material such as steel.

Figure 4:
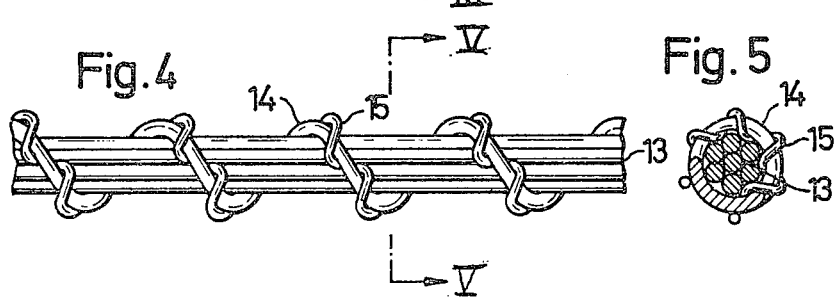
FIG. 4 represents a modified tool according to the invention for practicing the method of the invention.
Figure 5:
FIG. 5 represents a section taken along the line V—V of FIG. 4.

With the tool illustrated in FIGS. 4 and 5, a cable wire 14 is wound around cable 13 which corresponds to the cable 11 illustrated in FIGS. 2 and 3. The wire 14 corresponds in this instance to the wire 12. In contrast to the tool according to FIGS. 2 and 3, however, with the tool according to FIGS. 4 and 5, a further wire 15 is wound around the wire 14 at a predetermined pitch. This additional wire 15 will in many instances of employment considerably increase the cut output.

Figure 6:
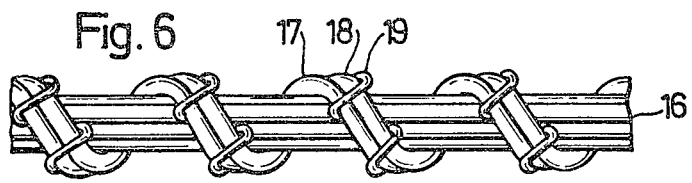
FIG. 6 illustrates still another embodiment of a tool according to the invention.

A further possible embodiment of the tool according to the invention which is advantageous in many instances is illustrated in FIG. 6. In this instance, two wires 17 and 18 arranged closely adjacent to each other and extending parallel to each other are arranged on a cable 16 at a predetermined pitch. In conformity with the embodiment of FIGS. 4 and 5, the wires 17 and 18 may have wound therearound an additional wire 19 with a predetermined pitch.

Figure 7:
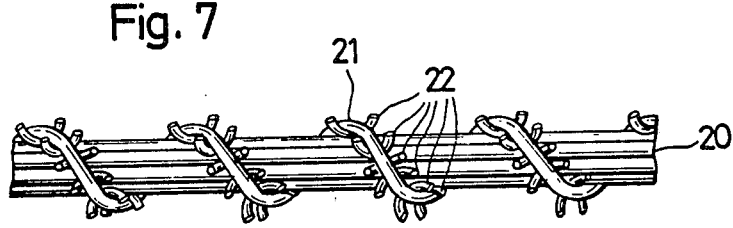
FIG. 7 shows still another very advantageous embodiment of a tool according to the invention.

Another embodiment of the invention which is very advantageous in other instances of employment is shown in FIG. 7. According to FIG. 7, a wire 21 is wound around cable 20. Between the cable 20 and wire 21 there are clamped in bristle-shaped like elements 22 which are secured in their respective positions in any suitable manner. When cutting certain types of foamed material, the elements 22 bring about an easier cut inasmuch as they tear open the pores of the foamed material.

Figure 8:
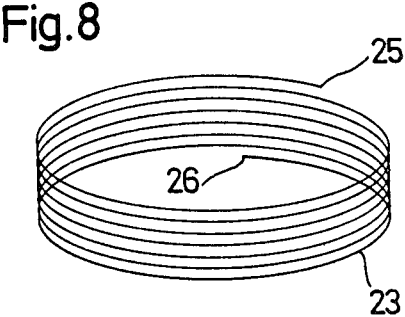
FIG. 8 illustrates a thread or wire for making the base body of a tool according to the invention.
Figure 9:
FIG. 9 shows the wire of FIG. 8 shaped for a tool according to the invention.

In addition to the embodiment shown in FIGS. 2 and 3, 4 and 5, and 6 and 7, there are, of course, other embodiments possible of the tool 10 according to the invention without going beyond the scope of the present invention. However, in each instance, as mentioned above, it is advantageous that the cable 11, 13, 16 or 20 utilized for producing a tool according to the invention will be made in such a way as illustrated in FIGS. 8 and 9. Correspondingly, a single finite wire 23 is combined to a predetermined number of windings so that an annular body 24 according to FIG. 9 is obtained. The individual windings of the wire 23 may be the utilization of a cement or glue be secured relative to each other in their respective position. However, the utilization of a glue or cement is not necessary under all circumstances because the annular body 24 which forms the cable 11, 13, 16, or 20 has additionally wound therearound a wire 12, 15, 17/18 or 21. The ends 25 and 26 of the wire 23 are preferably connected to each other over a certain length by soft soldering or the like.

When producing the annular body 24 for a cable, attention is to be drawn to the fact that the course of the wire 23 in the annular body 24 practically corresponds to the longitudinal extension or the course of the annular body 24.

It may furthermore be mentioned that the employed threads or wires may not only consist of steel but also of synthetic material such as polyamide and may have a diameter within the range of from 0.1 to 0.3 mm. For making the annular body 24, with reference to the problem to be solved, approximately seven windings of the wire 23 have proved expedient. For purposes of obtaining a rough surface, it is also possible in instead of providing the cable with a wire or wires wound therearound, to provide a cable with a cover of corundum.

It is, of course, to be understood that the present invention is, by no means, limited to the specific showing in the drawings but also comprises any modifications within the scope of the appended claims.

What we claim is:

1. A device for clean cutting of blocks of foamed synthetic material having individual pores especially foamed polyethylene linearly in an easily controlled manner, which includes in combination: an endless cable including a core of elastic wear resistant material adapted to withstand a maximum preload of from 5 to 30 kp and having a small diameter within the range of from 0.5 to 2 mm, and at least one wire of wear resistant material having a small diameter of from 0.1 to 0.3 mm and wound around said cable in a predetermined helical path, said endless cable having a physique whereby individual pores of the foam material are torn open by said wire wound around the core of the cable so that a clean and linear cut is achieved and also for attaining a separation cutting speed as high as possible due to the preload with simultaneously satisfactory quality of separation.

2. A device in combination according to claim 1, in which said endless cable and said wire of wear resistant material are both made of steel.

* * * * *